US012764183B2

(12) United States Patent
Lindmark et al.

(10) Patent No.: US 12,764,183 B2
(45) Date of Patent: Oct. 13, 2026

(54) LOW LATENCY PEER-TO-PEER NETWORK

(71) Applicant: Google LLC, Mountain View, CA (US)

(72) Inventors: Stefan Lindmark, Östhammar (SE); Alexander Schäfer, Duesseldorf (DE); Christopher Michael Probst-Ranly, Solingen (DE)

(73) Assignee: Google LLC, Mountain View, CA (US)

( * ) Notice: Subject to any disclaimer, the term of this patent is extended or adjusted under 35 U.S.C. 154(b) by 70 days.

(21) Appl. No.: 18/588,448

(22) Filed: Feb. 27, 2024

(65) Prior Publication Data

US 2025/0274507 A1 Aug. 28, 2025

(51) Int. Cl.

*H04L 67/104* (2022.01)
*H04L 67/63* (2022.01)
*H04N 21/2187* (2011.01)

(52) U.S. Cl.

CPC ............ *H04L 67/104* (2013.01); *H04L 67/63* (2022.05); *H04N 21/2187* (2013.01)

(58) Field of Classification Search

CPC ....... H04L 67/104; H04L 67/63; H04L 45/48; H04L 45/42; H04N 21/2187; H04N 21/632
USPC .......................................................... 709/238
See application file for complete search history.

(56) References Cited

U.S. PATENT DOCUMENTS 7,197,565 B2 * 3/2007 Abdelaziz ............... G06F 9/544 709/227
8,787,153 B2 * 7/2014 Begen ................... H04L 1/0018 370/228
9,258,341 B2 * 2/2016 El-Beltagy .......... H04L 67/1097
10,951,890 B1 * 3/2021 Dickson .............. H04L 65/1069
2004/0236863 A1 11/2004 Shen et al.
2009/0122724 A1 * 5/2009 Rosenberg .......... H04L 67/1065 370/255
2012/0030333 A1 * 2/2012 Hu ...................... H04L 67/1089 709/231
2013/0332533 A1 12/2013 Ramankrishnan et al.
2015/0237125 A1 * 8/2015 Damola ................ H04L 67/104 709/231
2015/0326657 A1 * 11/2015 Cohen ................. H04L 67/1046 709/231
2020/0204621 A1 6/2020 Brown et al.

OTHER PUBLICATIONS

International Search Report and Written Opinion for International Application No. PCT/US2025/017449, mailed May 23, 2025, 20 Pages.

* cited by examiner

*Primary Examiner* — Adil Ocak
(74) *Attorney, Agent, or Firm* — Lowenstein Sandler LLP

(57) ABSTRACT

A method includes receiving, at a server, first requests to register with a first peer-to-peer network from a first node, a second node, and a third node, the first peer-to-peer network providing transmission of live media data. The method further includes generating a first configuration for the first peer-to-peer network comprising at least the first node, the second node, and the third node, the first configuration defining a first set of one or more media data routes to provide the live media data to one or more peer nodes of the first peer-to-peer network upon receipt of the live media data by a respective one of the first node, the second node, and the third node. The method further includes transmitting one or more portions of the first configuration to each of the first node, the second node, and the third node.

20 Claims, 8 Drawing Sheets

LOW LATENCY PEER-TO-PEER NETWORK

TECHNICAL FIELD

Aspects and implementations of the present disclosure relate to computer networking, and in particular to a peer-to-peer network for transmitting live media data.

BACKGROUND

Peer-to-peer (P2P) networks have become increasingly prevalent in various computing environments, allowing decentralized communication and resource sharing among connected devices. Traditional P2P networks rely on direct connections between peers, enabling them to share information without the need for centralized servers. In some cases, a centralized node (e.g., tracker) is used to facilitate peer discovery and coordination among peers.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor to delineate any scope of the particular implementations of the disclosure or any scope of the claims. Its sole purpose is to present some concepts of the disclosure in a simplified form as a prelude to the more detailed description that is presented later.

In some implementations, a system and method are disclosed for low latency peer-to-peer networks. In an implementation, a method includes receiving, at a server, first requests to register with a first peer-to-peer network from a first node, a second node, and a third node, the first peer-to-peer network providing transmission of live media data. The method further includes generating a first configuration for the first peer-to-peer network comprising at least the first node, the second node, and the third node, the first configuration defining a first set of one or more media data routes to provide the live media data to one or more peer nodes of the first peer-to-peer network upon receipt of the live media data by a respective one of the first node, the second node, and the third node. The method further includes transmitting one or more portions of the first configuration to each of the first node, the second node, and the third node.

In some embodiments, at least one of the media data routes of the first set of one or more media data routes is a forward error correction media data route.

In some embodiments, the first set of one or more media data routes includes a first route for providing the live media data from a media distribution node to the first node, a second route for providing the live media data from the first node to the second node, and a third route for providing the live media data from the second node to the third node.

In some embodiments, the method further includes receiving, at the server, a second request to register with the first peer-to-peer network from a fourth node. The method further includes generating a second configuration for a second peer-to-peer network comprising at least the first node, the second node, the third node, and the fourth node, the second configuration defining a second set of one or more media data routes to provide the live media data to one or more peer nodes of the second peer-to-peer network upon receipt of the live media data by a respective one of the first node, the second node, the third node, and the fourth node.

The method further includes transmitting one or more portions of the second configuration to each of the first node, the second node, the third node, and the fourth node.

In some embodiments, the second set of one or more media data routes includes a first route for providing the live media data from a media distribution node to the first node, a second route for providing the live media data from the first node to the second node, a third route for providing the live media data from the second node to the third node, and a fourth route for providing the live media data from the second node to the fourth node.

In some embodiments, the second set of one or more media data routes includes a first route for providing the live media data from the media distribution node to the first node, a second route for providing the live media data from the first node to the second node, a third route for providing the live media data from the first node to the fourth node, a fourth route for providing the live media data from second node to the third node, and a fifth route for providing the live media data from the fourth node to the third node.

In some embodiments, the method further includes, responsive to detecting the second node is not part of the first peer-to-peer network, generating a second configuration for a second peer-to-peer network comprising at least the first node and the third node, the second configuration defining a second set of one or more media data routes to provide the live media data to one or more peer nodes of the second peer-to-peer network upon receipt of the live media data by a respective one of the first node and the third node. The second set of one or more media data routes includes a first route for providing the live media data from a media distribution node to the first node and a second route for providing the live media data from the first node to the third node. The method further includes transmitting one or more portions of the second configuration to each of the first node and the third node.

In some embodiments, the first set of one or more media data routes is semi-static and changes responsive to one or more nodes joining or leaving the first peer-to-peer network.

In some embodiments, the live media data is an individual frame of a media item.

In an implementation, a method includes receiving, at a first node of a peer-to-peer network, a configuration defining one or more media data routes to provide live media data to one or more peer nodes of the peer-to-peer network upon receipt of the live media data by the first node. The method further includes establishing one or more media data connections to the one or more peer nodes based on the one or more media data routes. The method further includes receiving live media data from a first parent node of the first node via a first media data connection of the one or more media data connections. The method further includes retransmitting the live media data to a first child node of the first node via a second media data connection of the one or more media data connections.

In some embodiments, the method further includes receiving the live media data from a second parent node via a third media data connection of the one or more media data connections.

In some embodiments, the method further includes retransmitting the live media data to a second child node via a third media data connection of the one or more media data connections.

In some embodiments, the first parent node is a media distribution node.

In some embodiments, the first parent node is a peer node of the peer-to-peer network.

In some embodiments, retransmitting the live media data to the first child node include copying the live media data provided via the first media data connection of the one or more media data connections with the first parent node for transmission via the second media data connection of the one or more media data connections with the first child node without inspecting the live media data.

In some embodiments, the method further includes causing the live media data to be reproduced.

In some embodiments, the live media data is an individual frame of a media item.

In some embodiments a computer-readable storage medium (which may be a non-transitory computer-readable storage medium, although the invention is not limited to that) stores instructions which, when executed, cause a processing device to perform operations comprising a method according to any embodiment or aspect described herein.

In some embodiments a system comprises: a memory device; and a processing device operatively coupled with the memory to perform operations comprising a method according to any embodiment or aspect described herein.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
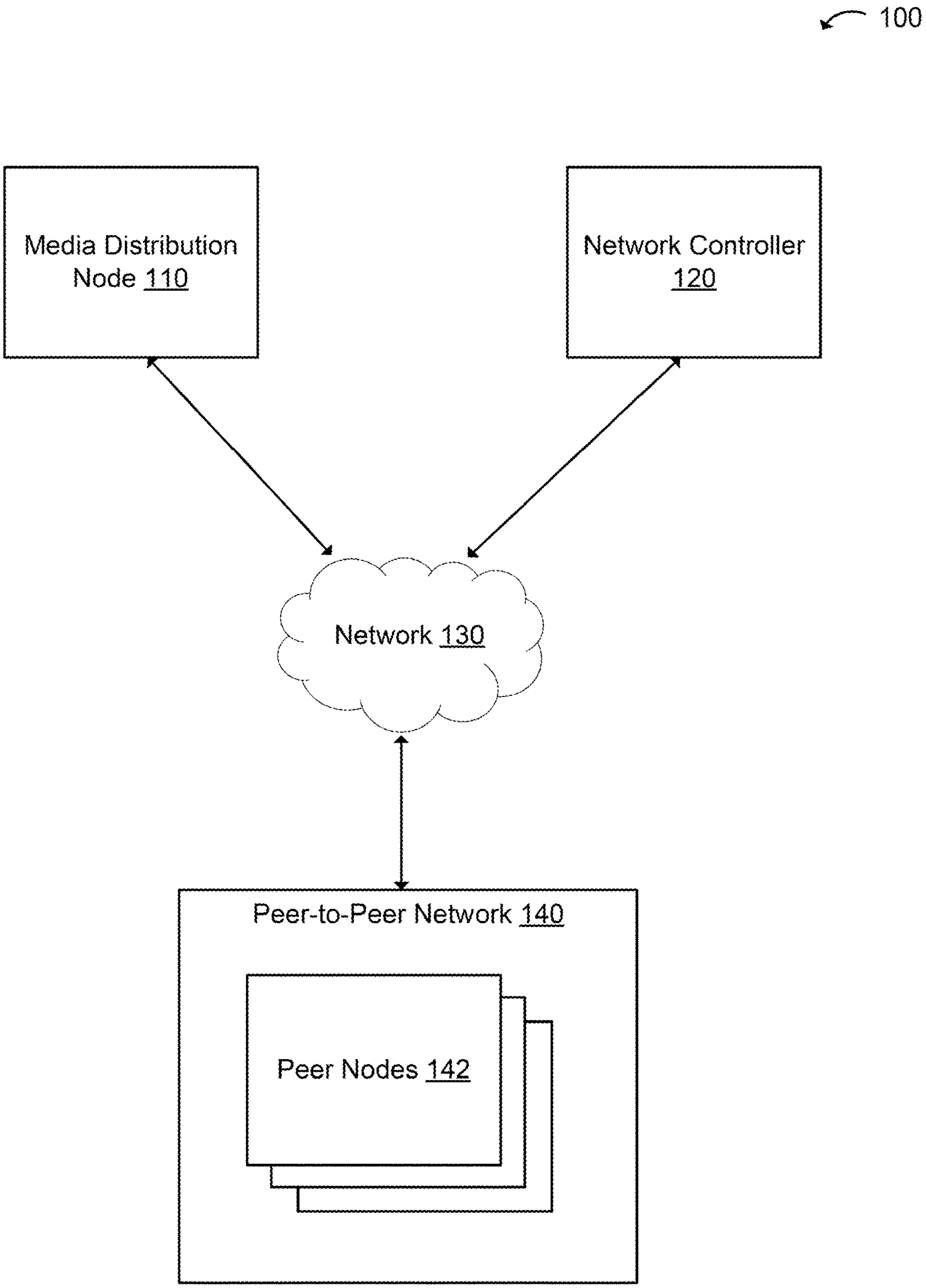
FIG. 1 illustrates an example system for low latency peer-to-peer networks, in accordance with at least one embodiment.

Traditional media forwarding in peer-to-peer networks follows a pattern where clients either consume media from the source or from another peer. When media (e.g., a video stream or an audio stream) is consumed from the source, the client (e.g., client device) downloads segments of the media to keep up with the playback rate required to render the media to a user (e.g., user of the client device). Each segment may be of a predetermined duration (e.g., 5 seconds). Each segment may include a sequence number denoting its relative position within the media item.

During a download (e.g., by "peer A"), records are kept by a central tracker service of which clients have downloaded which media segments. Each downloaded media segment is stored by the client in a local buffer. When a media player of the client (e.g., media player on the client device associated with peer A) needs a segment for playback, the segment is retrieved from the buffer and rendered to the user. Once rendered, the segment is no longer needed by peer A for playback. However, the segment remains in the local buffer and is not immediately discarded, according to application specific rules (e.g., until the buffer space is needed for storing newer segments, for a specific time, etc.).

Another client (e.g., "peer B") that requests the same segment of media (e.g., from the central tracker) may learn from the central tracker that one or more other clients (e.g., peer A) have already downloaded this specific media segment. Peer B may make a request to peer A (and potentially also to other peers in parallel) asking if peer A still has the media segment cached in peer A's local buffer. If the segment is available, peer B may request the segment to be delivered from peer A and, in the case of other parallel requests, may cancel the requests to other peers.

This approach, however, is not optimal for real-time applications with very low latency (e.g., 300 milliseconds) requirements, such as virtual meeting media data and/or live-streaming media. For example, between the time peer A asks the tracker which peers have a particular media segment and the time peer A requests the particular media segment from one of the peers indicated by the tracker, the peer may no longer have the media segment in its local buffer, causing peer A to make additional requests to the tracker and/or peer nodes for the media segment, increasing network traffic and latency. Additionally, each peer needs to have a sufficiently large buffer allocated from its local storage to allow peers to answer requests for media segments with a reasonable success rate. Additionally, before a peer node can notify the tracker that it has a media segment that can be shared with peers, the whole media segment needs to be stored in the local buffer. If each media segment includes 5 seconds of data, there will be at least 5 seconds of latency before retransmission to another node can occur.

Aspects of the present disclosure address the above and other deficiencies by providing frameworks for low latency peer-to-peer networks. For example, to receive live media data (e.g., virtual meeting media data, live-streaming media, etc.) with low latency, a plurality of nodes can register with a network controller to participate in a peer-to-peer network for live media data transmission. The network controller can determine a peer-to-peer network configuration (e.g., an optimal peer-to-peer network topology) for transmitting the video data from a source (e.g., a media distribution service, a virtual meeting service, a video broadcasting service, etc.) with low latency and resiliency (e.g., with forward error correction for an uninterrupted viewing experience). The network controller can designate one or more nodes as source nodes that receive video data directly from the source (e.g., media distribution service). The network controller can designate the remaining nodes as peer nodes that receive video data from one or more source nodes and/or other peers. The network controller can transmit one or more portions of the network configuration to each of the nodes of the peer-to-peer network.

The nodes of the peer-to-peer network can establish media data connections with a media data source and/or peer nodes based on the configuration received from the network controller. For example, a first node of the peer-to-peer network can be designated as a source node. The first node can establish a media data connection with a media data source. The first node can also establish one or more media data connections with peer nodes (e.g., children nodes) of the peer-to-peer network, based on the received configuration. The media data source can provide (e.g., push) live media data to the first node via the established media data connection. Upon receiving the live media data, the first node can copy the live media data provided via the first media data connection (e.g., the media data connection with the media data source) for transmission via the one or more media data connections with peer nodes. The first node can also cause the live media data to be reproduced (e.g., via a media player of the first node) as the live media data is received (instead of storing the live media data in a local buffer).

The live media data may refer to media data that is streamed in real-time (e.g., as it is received and without waiting for the receipt of the entire media item) and may represent individual frames of a media item. For example, the media data of a virtual video conference may be segmented into individual video frames that may be provided to the network (e.g., from a media source to one or more source nodes) and concurrently (e.g., simultaneously) retransmitted and reproduced by the nodes that receive the individual frames.

A second node of the peer-to-peer network can receive the live media data from one or more parent nodes (e.g., source nodes, peer nodes). The second node can establish media data connections with one or more peer nodes (e.g., children nodes) of the peer-to-peer network, and can copy (e.g., immediately or with an insignificant delay) the live media data received from the one (or more) parent nodes to the one or more children nodes via the media data connections. A node of the peer-to-peer network can receive live media data from more than one parent as a form of forward error correction, which may refer to transmission of redundant data to provide a smooth playback experience even if a node unexpectedly leaves the peer-to-peer network.

The network configuration may define the media data routes that the live media data traverses between the nodes of the peer-to-peer network. The media data routes may be semi-static, such that they are only modified when nodes join or leave the network. If a node joins or leaves the network, the network controller can generate a second network configuration corresponding to an optimal peer-to-peer network topology for the new set of nodes in the network and can transmit one or more portions of the second configuration to the nodes of the peer-to-peer network.

Advantages of the disclosed embodiments over the existing technology include but are not limited to reduced latency as a result of reducing the number of roundtrip messages required to receive the live media data (since data will be "pushed" to devices instead of "pulled") and immediately or with an insignificant delay retransmitting received media data (e.g., individual frames of a media item). Additionally, storage requirements are greatly reduced on client devices since a local buffer is no longer required to store multiple media segments for retransmission to peers.

FIG. 1 illustrates an example system 100 for low latency peer-to-peer networks, in accordance with at least one embodiment. System 100 can include media distribution node 110, network controller 120, and peer-to-peer network 140 connected to network 130, such as a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

Media distribution node 110 can provide live media data for transmission within peer-to-peer network 140. In some embodiments, media distribution node 110 can be part of peer-to-peer network 140. In some embodiments, media distribution node 110 can be in a network different than peer-to-peer network 140. Media distribution node 110 can include one or more sources for live media data. For example, media distribution node 110 can be part of a cloud computing environment that provides live media data to various entities, such as a video conferencing platform or a video broadcasting platform. Upon receiving a connection from one or more source nodes of peer-to-peer network 140, media distribution node 110 can provide (e.g., push) live media data (e.g., individual frames of a media item) to the one or more source nodes via one or more media data connections.

Network controller 120 can manage peer-to-peer network 140. For example, network controller 120 can receive requests (e.g., from one or more client devices, from peer nodes 142, etc.) to register with peer-to-peer network 140 and can configure peer-to-peer network 140 based on the nodes (e.g., peer nodes 142) included in peer-to-peer network 140. Network controller 120 can generate one or more configuration files for peer-to-peer network 140. The configuration files may define one or more media data routes within peer-to-peer network 140 between peer nodes 142 for transmission of live media data as the live media data is received by a respective peer of peer nodes 142. Network controller 120 can send portions of the network configuration (or the whole network configuration) to each node (e.g., peer nodes 142) of peer-to-peer network 140. Based on the received network configuration (or portions thereof), the nodes of the peer-to-peer network 140 can establish one or more media data connections for providing (e.g., pushing) live media data within the peer-to-peer network.

In some embodiments, network controller 120 generates a network configuration (e.g., network topology) with semi-static routes. For example, routes between nodes of the peer-to-peer network (e.g., media data connections) may only be changed (e.g., added, removed) when the nodes within the peer-to-peer network change (e.g., when nodes are added to the network, when nodes disconnect from or leave the network, etc.).

In some embodiments, the network configuration generated by network controller 120 may include one or more forward error correction media data routes. For example, a node of the peer-to-peer network (e.g., peer-to-peer network 140) may be configured to receive redundant media data to ensure smooth media playback at the node. In some embodiments, a child node can receive two copies of the media data: a first copy from a first parent node and a second copy from a second parent node. If the first parent node were to leave the peer-to-peer network, the child node can continue to receive the media data without interruption from the second parent node. Upon determining that the first parent node has left the peer-to-peer network, network controller 120 can generate a new network configuration with media data routes that ensure the child node again receives redundant media data (e.g., media data from two or more parent nodes). The new network configuration (or portions thereof) may be transmitted to the nodes of the peer-to-peer network, and one or more new media data connections may be established by the nodes in accordance with the new network configuration. In some embodiments, media data connections may be disconnected if there is not a corresponding media data route in the network configuration.

Peer-to-peer network 140 may be used for transmission of live media data between one or more peer nodes. Peer-to-peer network 140 may be connected to another network (e.g., network 130). In some embodiments, the media data that is transmitted within peer-to-peer network 140 may originate outside of peer-to-peer network 140 and/or may be accessed via another network (e.g., network 130).

Figure 4:
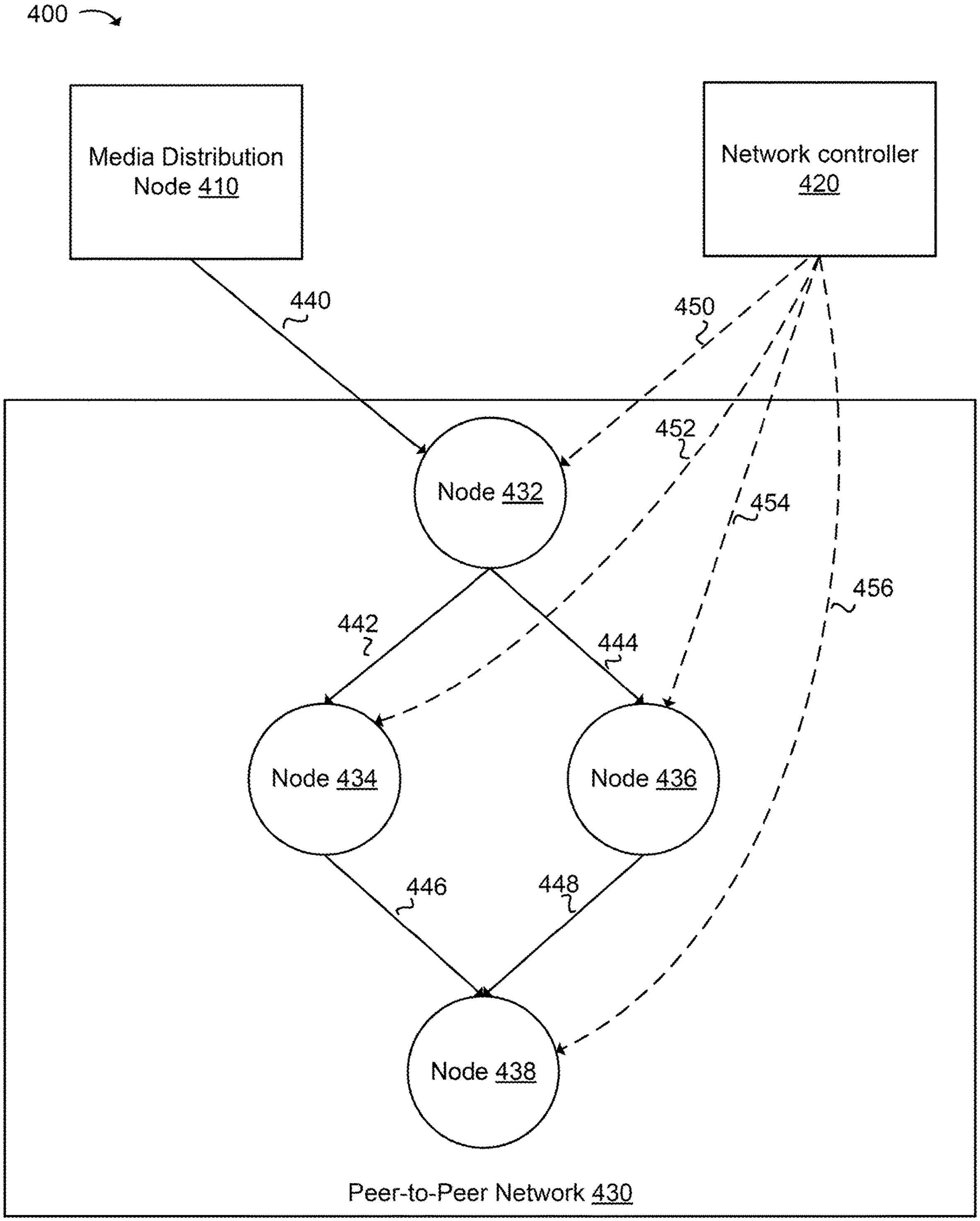
FIG. 4 depicts an example live media data distribution network, in accordance with at least one embodiment.

In some embodiments, peer-to-peer network 140 includes one or more peer nodes 142. Peer nodes 142 may include one or more processing devices, volatile and non-volatile memory, data storage, one or more input/output peripherals such as network interfaces. FIG. 4 illustrates an example architecture of computing devices. In some embodiments, peer nodes 142 may be singular devices such as smartphones, tablets, laptops, desktops, workstations, edge devices, embedded devices, servers, network appliances, security appliances, etc. In some embodiments, peer nodes 142 may comprise multiple devices of similar or varying architecture such as computing clusters, data centers, co-located servers, enterprise networks, geographically disparate devices connected via virtual private networks (VPNs), etc. In some embodiments, peer nodes 142 may comprise hardware devices such as those just described, virtual resources such as virtual machines (VMs) and containerized applications, or a combination of hardware and virtual resources.

Peer nodes 142 may include one or more source nodes and one or more peering nodes. In some embodiments, peer nodes 142 may be configured in parent-child relationships and may have "parent" nodes that provide (e.g., push) live media data to the node and may have "children" nodes that the node provides (e.g., pushes) the live media data to. To join peer-to-peer network 140, a peer node can send a request to network controller 120 to register with peer-to-peer network 140. Network controller 120 can generate a new network configuration based on the addition of the peer node to the peer-to-peer network and can transmit the new configuration (or portions thereof) to one or more nodes of the peer-to-peer network (e.g., the nodes that have different (e.g., more, fewer) media data routes as compared to the previous network configuration as a result of the new peer node joining the network).

Source nodes may be configured (e.g., by network controller 120) to connect directly to media distribution node 110. In some embodiments, source nodes can connect to more than one media distribution node. After establishing a connection (e.g., media data connection) with media distribution node 110, media distribution node 110 can provide (e.g., push) live media data to the source node via the established connection. In some embodiments, the connection stays open until all live media data has been transmitted to the source node (e.g., until all frames of a media item have been individually transmitted). The source node can also be configured (e.g., by network controller 120) to connect to one or more peering nodes of peer-to-peer network 140 and can establish connections to each of the one or more peering nodes. Upon receiving live media data from media distribution node 110, the source node can immediately (or with insignificant delay) retransmit the received live media data to the one or more peering nodes. For example, the source node can receive live media data via a first media data connection connected to media distribution node 110 and can immediately (or with insignificant delay) copy the received live media data to a second media data connection connected to another peer node of peer-to-peer network 140. In some embodiments, the source node does not save the live media data in a local buffer. As live media data is received, the source node can immediately (or with insignificant delay) reproduce the received live media data (e.g., via a media player of the source node).

Peering nodes may be configured (e.g., by network controller 120) to connect to one or more other nodes (e.g., source nodes, peering nodes) of peer-to-peer network 140. A peering node may be configured to connect to one or more parent nodes. In some embodiments, peering nodes may be configured to connect to two or more parent nodes, such that the peering nodes have at least one forward error correction connection. After the peering node has established connections with the one or more parent nodes, the parent node(s) can provide (e.g., push) live media data to the peering node via the established media data connection(s) as soon as the parent node(s) receive the live media data from their parent node(s).

In some embodiments, a peering node may be configured (e.g., by network controller 120) to connect to one or more child nodes. After the peering node has established connections with the one or more child nodes, the peering node can provide (e.g., push) live media data to the child node(s) via the established media data connection(s) as soon as the peering node receives the live media data from its parent node(s). In some embodiments, if a peering node receives more than one copy (e.g., two copies, three copies, etc.) of the live media data (e.g., one copy from each of two or more parent nodes), the peering node may deduplicate the data and may provide only one copy of the live media data to the child node(s). In some embodiments, a peering node can only establish connection(s) with the parent node(s) it is configured to connect to and will wait for its child node(s) to establish connections with it (instead of establishing connections with the child node(s) itself).

In implementations of the disclosure, a "user" can be represented as a single individual. However, other implementations of the disclosure encompass a "user" being an entity controlled by a set of users or an organization and/or an automated source such as a system or a platform. In situations in which the systems discussed here collect personal information about users, or can make use of personal information, the users can be provided with an opportunity to control whether media distribution node 110, network controller 120, and/or peer nodes 142 collect user information (e.g., information about a user's social network, social actions or activities, profession, a user's preferences, or a user's current location), or to control whether and/or how to receive content from media distribution node 110, network controller 120, and/or peer nodes 142 that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by media distribution node 110, network controller 120, and/or peer nodes 142.

Figure 2:
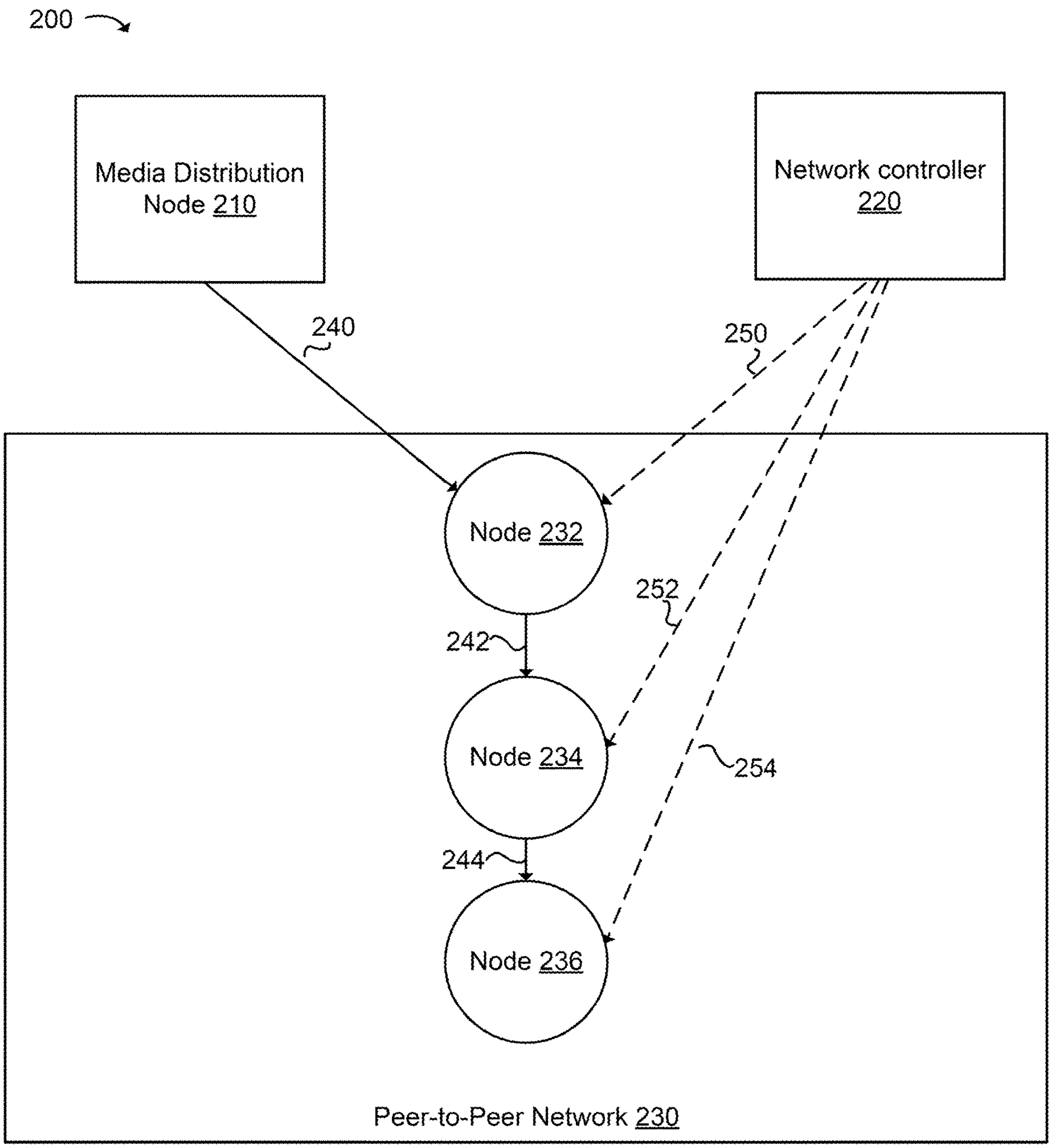
FIG. 2 depicts an example live media data distribution network, in accordance with at least one embodiment.

FIG. 2 depicts an example live media data distribution network 200, in accordance with at least one embodiment. In some embodiments, network 200 may include media distribution node 210, network controller 220, and peer-to-peer network 230 with peer node 232, peer node 234, and peer node 236. Network controller 220 can generate a network configuration for network 200. The network configuration can include one or more media data routes for transmission of live media data between the nodes of peer-to-peer network 230. Network controller 220 can transmit the network configuration (or parts thereof) to the nodes of peer-to-peer network 230 via one or more network controller connections. For example, when registering with the peer-to-peer network, each peer node (e.g., peer node 232, peer node 234, peer node 236) can establish a connection (e.g., network controller connection 250, network controller connection 252, network controller connection 254) with network controller 220 which is used for receiving network configuration updates.

Peer node 232, after receiving the network configuration from network controller 220 (e.g., via network controller connection 250), can establish one or more media data connections based on the media data routes included in the network configuration. For example, peer node 232 can be designated as a source node (e.g., in the network configuration) and can establish media data connection 240 with media distribution node 210. Media distribution node 210 can use media data connection 240 for providing (e.g., pushing) live media data to peer node 232. In some embodiments, the network configuration may include a media data route between peer node 232 and peer node 234 (e.g., the network configuration may designate peer node 234 as a child node of peer node 232). Peer node 232 can establish media data connection 242 with peer node 234 and, upon receiving live media data from media distribution node 210, can immediately (or with insignificant delay) retransmit the live media data to peer node 234 via media data connection 242.

Peer node 234, after receiving the network configuration from network controller 220 (e.g., via network controller connection 252), can establish one or more media data connections based on the media data routes included in the network configuration. For example, peer node 234 can be designated as a peering node (e.g., in the network configuration) and can receive live media data from one or more other peer nodes of peer-to-peer network 230. If media data connection 242 has not already been established (e.g., by peer node 232), peer node 234 can establish media data connection 242 with peer node 232. Peer node 234 can use media data connection 242 to receive live media data provided (e.g., pushed) by peer node 232. In some embodiments, the network configuration may include a media data route between peer node 234 and peer node 236 (e.g., the network configuration may designate peer node 236 as a child node of peer node 234). Peer node 234 can establish media data connection 244 with peer node 236 and, upon receiving live media data from peer node 232, can immediately (or with insignificant delay) retransmit the live media data to peer node 236 via media data connection 244.

Peer node 236, after receiving the network configuration from network controller 220 (e.g., via network controller connection 254), can establish one or more media data connections based on the media data routes included in the network configuration. For example, node 236 can be designated as a peering node (e.g., in the network configuration) and can receive live media data from one or more other peer nodes of peer-to-peer network 230. If media data connection 244 has not already been established (e.g., by peer node 234), peer node 236 can establish media data connection 244 with peer node 234. Peer node 236 can use media data connection 244 to receive live media data provided (e.g., pushed) by peer node 234.

Thus, network 200 may include peer-to-peer network 230, which may include one source node (e.g., peer node 232), a peering node with one parent node and one child node (e.g., peer node 234), and a peering node with one parent node and no child nodes (e.g., peer node 236).

Figure 3:
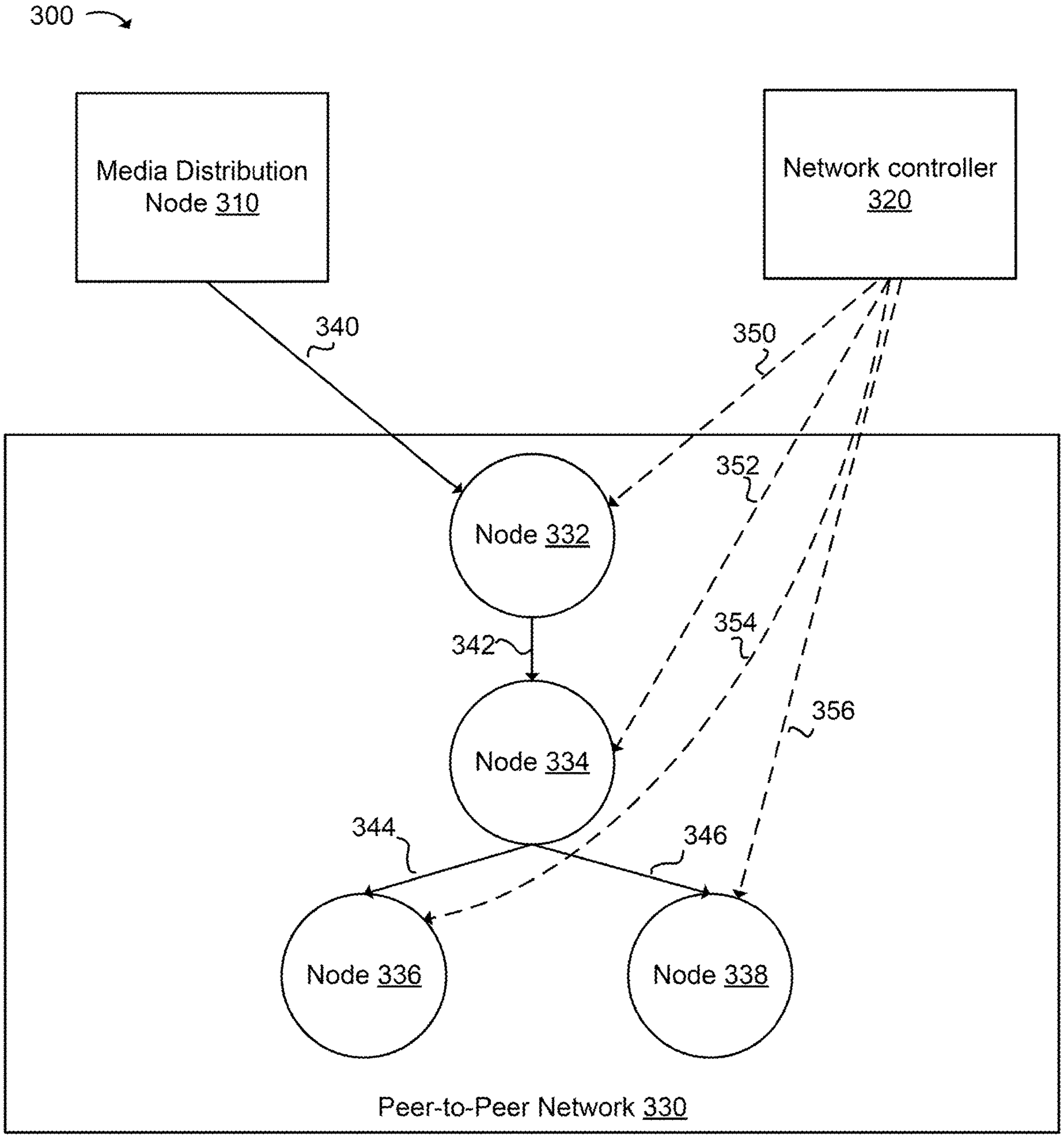
FIG. 3 depicts an example live media data distribution network, in accordance with at least one embodiment.

FIG. 3 depicts an example live media data distribution network 300, in accordance with at least one embodiment. In some embodiments, network 300 may include media distribution node 310, network controller 320, and peer-to-peer network 330 with peer node 332, peer node 334, peer node 336, and peer node 338. Network controller 320 can generate a network configuration for network 300. The network configuration may include one or more media data routes for transmission of live media data between the nodes of peer-to-peer network 330. Network controller 320 can transmit the network configuration (or parts thereof) to the nodes of peer-to-peer network 330 via one or more network controller connections. For example, when registering with the peer-to-peer network, each peer node (e.g., peer node 332, peer node 334, peer node 336, and peer node 338) can establish a connection (e.g., network controller connection 350, network controller connection 352, network controller connection 354, and network controller connection 356) with network controller 320 which is used for receiving network configuration updates.

Peer node 332, after receiving the network configuration from network controller 320 (e.g., via network controller connection 350), can establish one or more media data connections based on the media data routes included in the network configuration. For example, peer node 332 can be designated as a source node (e.g., in the network configuration) and can establish media data connection 340 with media distribution node 310. Media distribution node 310 can use media data connection 340 for providing (e.g., pushing) live media data to peer node 332. In some embodiments, the network configuration may include a media data route between peer node 332 and peer node 334 (e.g., the network configuration may designate peer node 334 as a child node of peer node 332). Peer node 332 can establish media data connection 342 with peer node 334 and, upon receiving live media data from media distribution node 310, can immediately (or with insignificant delay) retransmit the live media data to peer node 334 via media data connection 342.

Peer node 334, after receiving the network configuration from network controller 320 (e.g., via network controller connection 352), can establish one or more media data connections based on the media data routes included in the network configuration. For example, peer node 334 can be designated as a peering node (e.g., in the network configuration) and can receive live media data from one or more other peer nodes of peer-to-peer network 330. If media data connection 342 has not already been established (e.g., by peer node 332), peer node 334 can establish media data connection 342 with peer node 332. Peer node 334 can use media data connection 342 to receive live media data provided (e.g., pushed) by peer node 332. In some embodiments, the network configuration may include a media data route between peer node 334 and peer node 336 (e.g., the network configuration may designate peer node 336 as a child node of peer node 334) and a media data route between peer node 334 and peer node 338 (e.g., the network configuration may designate peer node 338 as a child node of peer node 334). Peer node 334 can establish media data connection 344 with peer node 336 and can establish media data connection 346 with peer node 338. Upon receiving live media data from peer node 332, peer node 334 can immediately (or with insignificant delay) retransmit the live media data to peer node 336 via media data connection 344 and to peer node 338 via media data connection 346.

Peer node 336, after receiving the network configuration from network controller 320 (e.g., via network controller connection 354), can establish one or more media data connections based on the media data routes included in the network configuration. For example, peer node 336 can be designated as a peering node (e.g., in the network configuration) and can receive live media data from one or more other peer nodes of peer-to-peer network 330. If media data connection 344 has not already been established (e.g., by peer node 334), peer node 336 can establish media data connection 344 with peer node 334. Peer node 336 can use media data connection 344 to receive live media data provided (e.g., pushed) by peer node 334.

Peer node 338, after receiving the network configuration from network controller 320 (e.g., via network controller connection 356), can establish one or more media data connections based on the media data routes included in the network configuration. For example, peer node 338 can be designated as a peering node (e.g., in the network configuration) and can receive live media data from one or more other peer nodes of peer-to-peer network 330. If media data connection 346 has not already been established (e.g., by peer node 334), peer node 338 can establish media data connection 346 with peer node 334. Peer node 338 can use media data connection 346 to receive live media data provided (e.g., pushed) by peer node 334.

Thus, network 300 may include peer-to-peer network 330, which may include one source node (e.g., peer node 332), a peering node with one parent node and two child nodes (e.g., peer node 334), and two peering nodes with one parent node and no child nodes (e.g., peer node 336 and peer node 338).

FIG. 4 depicts an example live media data distribution network 400, in accordance with at least one embodiment. In some embodiments, network 400 may include media distribution node 410, network controller 420, and peer-to-peer network 430 with peer node 432, peer node 434, peer node 436, and peer node 438. Network controller 420 can generate a network configuration for network 400. The network configuration may include one or more media data routes for transmission of live media data between the nodes of peer-to-peer network 430. Network controller 420 can transmit the network configuration (or parts thereof) to the nodes of peer-to-peer network 430 via one or more network controller connections. For example, when registering with the peer-to-peer network, each peer node (e.g., peer node 432, peer node 434, peer node 436, and peer node 438) can establish a connection (e.g., network controller connection 450, network controller connection 452, network controller connection 454, and network controller connection 456) with network controller 420 which is used for receiving network configuration updates.

Peer node 432, after receiving the network configuration from network controller 420 (e.g., via network controller connection 450), can establish one or more media data connections based on the media data routes included in the network configuration. For example, peer node 432 can be designated as a source node (e.g., in the network configuration) and can establish media data connection 440 with media distribution node 410. Media distribution node 410 can use media data connection 440 for providing (e.g., pushing) live media data to peer node 432. In some embodiments, the network configuration may include a media data route between peer node 432 and peer node 434 (e.g., the network configuration may designate peer node 434 as a child node of peer node 432) and a media data route between peer node 432 and peer node 436 (e.g., the network configuration may designate peer node 436 as a child node of peer node 432). Peer node 432 can establish media data connection 442 with peer node 434 and media data connection 444 with peer node 436. Upon receiving live media data from media distribution node 410, peer node 432 can immediately (or with insignificant delay) retransmit the live media data to peer node 434 via media data connection 442 and to peer node 436 via media data connection 444.

Peer node 434, after receiving the network configuration from network controller 420 (e.g., via network controller connection 452), can establish one or more media data connections based on the media data routes included in the network configuration. For example, peer node 434 can be designated as a peering node (e.g., in the network configuration) and can receive live media data from one or more other peer nodes of peer-to-peer network 430. If media data connection 442 has not already been established (e.g., by peer node 432), peer node 434 can establish media data connection 442 with peer node 432. Peer node 434 can use media data connection 442 to receive live media data provided (e.g., pushed) by peer node 432. In some embodiments, the network configuration may include a media data route between peer node 434 and peer node 438 (e.g., the network configuration may designate peer node 438 as a child node of peer node 434). Peer node 434 can establish media data connection 446 with peer node 438, and upon receiving live media data from peer node 432, can immediately (or with insignificant delay) retransmit the live media data to peer node 438 via media data connection 446.

Peer node 436, after receiving the network configuration from network controller 420 (e.g., via network controller connection 454), can establish one or more media data connections based on the media data routes included in the network configuration. For example, peer node 436 can be designated as a peering node (e.g., in the network configuration) and can receive live media data from one or more other peer nodes of peer-to-peer network 430. If media data connection 444 has not already been established (e.g., by peer node 432), peer node 436 can establish media data connection 444 with peer node 432. Peer node 436 can use media data connection 444 to receive live media data provided (e.g., pushed) by peer node 432. In some embodiments, the network configuration may include a media data route between peer node 436 and peer node 438 (e.g., the network configuration may designate peer node 438 as a child node of peer node 436). Peer node 436 can establish media data connection 448 with peer node 438, and upon receiving live media data from peer node 432, can immediately (or with insignificant delay) retransmit the live media data to peer node 438 via media data connection 448.

Peer node 438, after receiving the network configuration from network controller 420 (e.g., via network controller connection 456), can establish one or more media data connections based on the media data routes included in the network configuration. For example, peer node 438 can be designated as a peering node (e.g., in the network configuration) and can receive live media data from one or more other peer nodes of peer-to-peer network 430. If media data connection 446 has not already been established (e.g., by peer node 434), peer node 438 can establish media data connection 446 with peer node 434. If media data connection 448 has not already been established (e.g., by peer node 436), peer node 438 can establish media data connection 448 with peer node 436. Peer node 338 can use media data connection 446 and media data connection 448 to receive live media data provided (e.g., pushed) by peer node 434 and peer node 436, respectively.

Thus, network 400 may include peer-to-peer network 430, which may include one source node (e.g., peer node 432), two peering nodes with one parent node and one child node (e.g., peer node 434 and peer node 436), and a peering node with two parent nodes and no child nodes (e.g., peer node 438).

Figure 5:
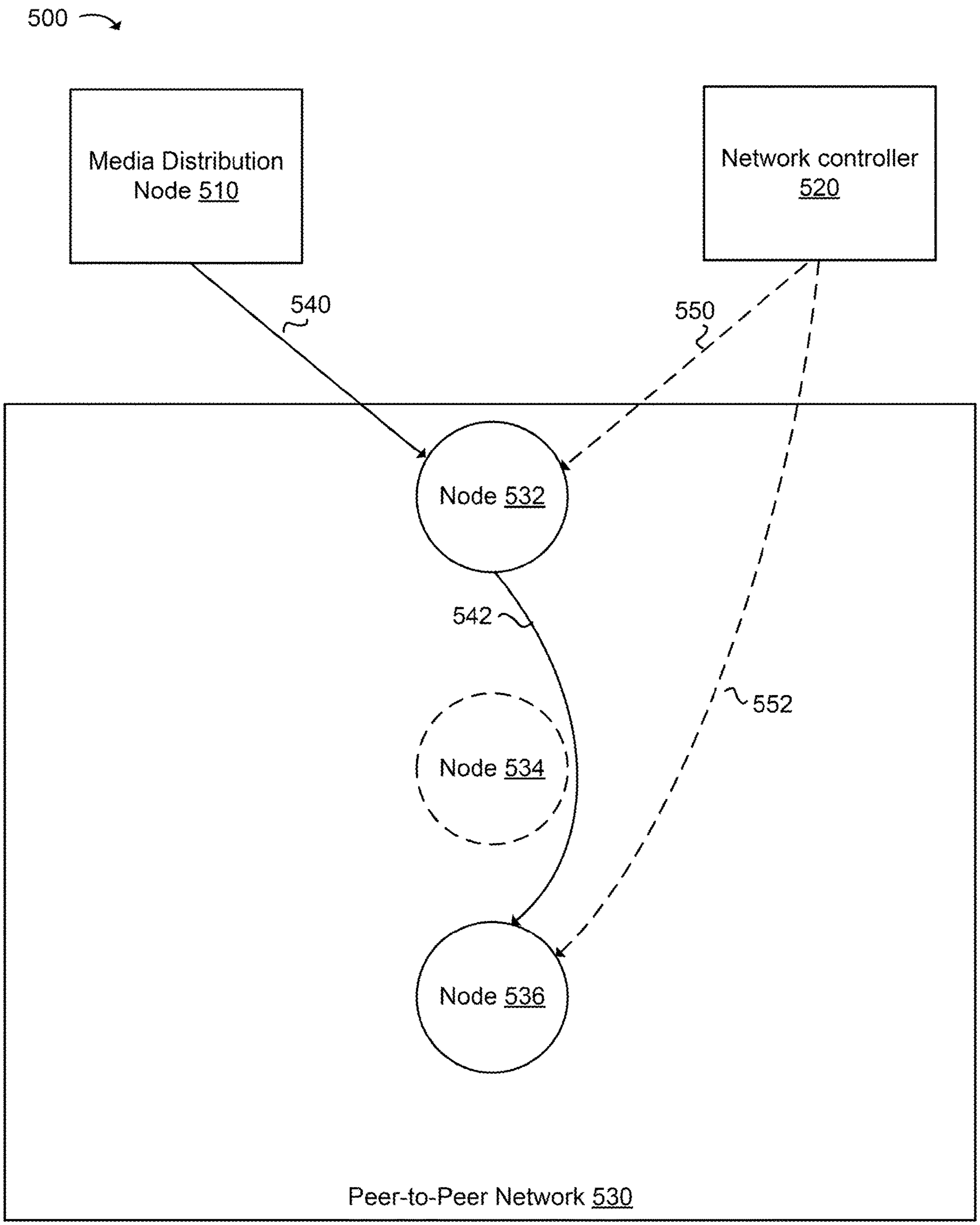
FIG. 5 depicts an example live media data distribution network, in accordance with at least one embodiment.

FIG. 5 depicts an example live media data distribution network 500, in accordance with at least one embodiment. In some embodiments, network 500 may include media distribution node 510, network controller 520, and peer-to-peer network 530 with peer node 532, peer node 534, and peer node 536. Network controller 520 can generate a network configuration for network 500. The network configuration may include one or more media data routes for transmission of live media data between the nodes of peer-to-peer network 530. Network controller 520 can transmit the network configuration (or parts thereof) to the nodes of peer-to-peer network 530 via one or more network controller connections. For example, when registering with the peer-to-peer network, each peer node can establish a connection with network controller 520 which is used for receiving network configuration updates.

Peer node 534 (depicted with a dashed outline) can have recently disconnected from peer-to-peer network 530 (e.g., as a result of losing network connectivity, a dead battery, closing the lid of the laptop, etc.). As a result, network controller 520 can generate a new network configuration. In the old network configuration, peer node 532 can have been connected to peer node 534, which was in turn connected to peer node 536. Now that peer node 534 has left peer-to-peer network 530, network controller 520 can connect peer node 532 and peer node 536 directly.

Peer node 532, after receiving the new network configuration from network controller 520 (e.g., via network controller connection 550), can establish one or more media data connections based on the media data routes included in the new network configuration and can disconnect any media data connections that do not have a corresponding media data route included in the new network configuration. For example, peer node 532 can have previously been designated as a source node in the previous network configuration, and because peer node 532 is still designated as a source node in the new network configuration, can maintain media data connection 540 with media distribution node 510. Media distribution node 510 can continue to use media data connection 540 for providing (e.g., pushing) live media data to peer node 532. The new network configuration may include a media data route between peer node 532 and peer node 536 (e.g., the new network configuration may designate peer node 536 as a child node of peer node 532). Peer node 532 can establish media data connection 542 with peer node 536 and, upon receiving live media data from media distribution node 510, can immediately (or with insignificant delay) retransmit the live media data to peer node 536 via media data connection 542. If a media data connection continues to exist between peer node 532 and peer node 534, peer node 532 can remove the connection.

Peer node 536, after receiving the new network configuration from network controller 520 (e.g., via network controller connection 552), can establish one or more media data connections based on the media data routes included in the new network configuration and can disconnect any media data connections that do not have a corresponding media data route included in the new network configuration. For example, peer node 536 can have been designated as a peering node in the previous network configuration and can be designated as a peering node in the new network configuration. In some embodiments, a peer node can be designated as a peering node in a first network configuration and as a source node in a second network configuration, or vice versa. As a peering node, peer node 536 can receive live media data from one or more other peer nodes of peer-to-peer network 530. If media data connection 542 has not already been established (e.g., by peer node 532), peer node 536 can establish media data connection 542 with peer node 532. Peer node 536 can use media data connection 542 to receive live media data provided (e.g., pushed) by peer node 532.

Thus, as nodes leave (or join) peer-to-peer network 530, network controller 520 can generate (and transmit) new network configurations to maintain media data routes between nodes in the network.

Networks 200, 300, 400, and 500 of FIGS. 2-5 should be seen as examples of live media data distribution networks (or subsets of live media data distribution networks). Some networks may include more nodes (e.g., more source nodes, more peering nodes), nodes with more parent nodes (e.g., nodes with 2 parent nodes, 3 parent nodes, or more), nodes with more child nodes (e.g., nodes with 2 child nodes, 3 child nodes, or more), and/or a combination thereof.

Figure 6:
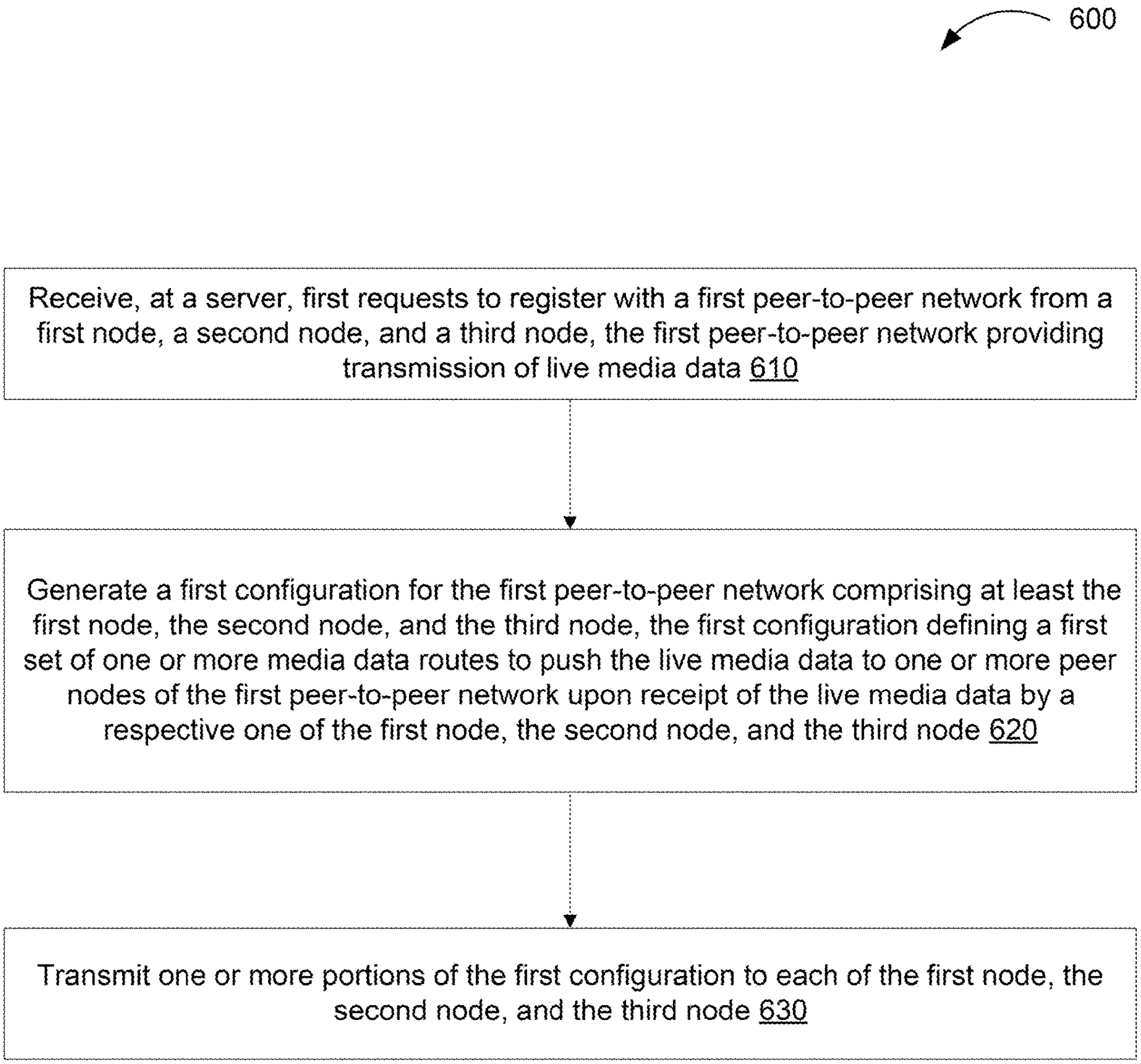
FIG. 6 depicts a flow diagram of an example method of facilitating low latency peer-to-peer networks, in accordance with at least one embodiment.
Figure 7:
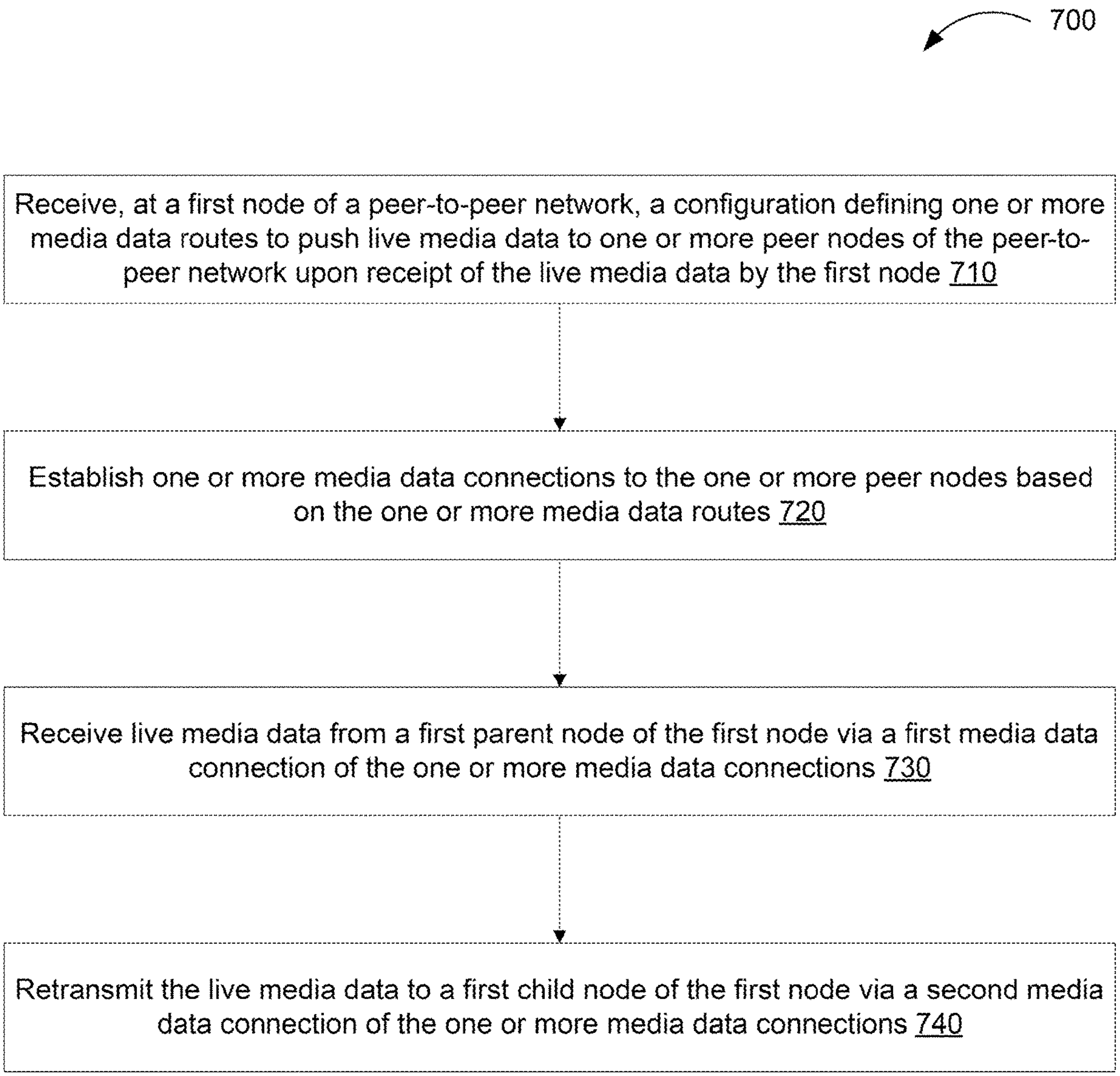
FIG. 7 depicts a flow diagram of an example method of facilitating low latency peer-to-peer networks, in accordance with at least one embodiment.

FIGS. 6-7 depict flow diagrams of example methods 600 and 700 of facilitating low latency peer-to-peer networks, in accordance with some embodiments. Method 600 and/or method 700 can be performed by processing logic that can include hardware (circuitry, dedicated logic, etc.), software (e.g., instructions run on a processing device), or a combination thereof. In at least one implementation, some or all of the operations of method 600 and/or method 700 can be performed by one or more components of system 100 for low latency peer-to-peer networks of FIG. 1. For example, in some embodiments, method 600 can be performed by network controller 120 of FIG. 1. In some embodiments, method 700 can be performed by peer nodes 142 of FIG. 1.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states e.g., via a state diagram. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Referring to FIG. 6, at block 610, processing logic can receive, at a server (e.g., network controller 120 of FIG. 1), first requests to register with a first peer-to-peer network from a first node, a second node, and a third node (e.g., peer nodes 142 of FIG. 1). The first peer-to-peer network may provide transmission of live media data.

At block 620, processing logic can generate a first configuration for the first peer-to-peer network comprising at least the first node, the second node, and the third node. The first configuration may define a first set of one or more media data routes to provide (e.g., push) the live media data to one or more peer nodes of the first peer-to-peer network upon receipt of the live media data by a respective one of the first node, the second node, and the third node. In some embodiments, at least one of the media data routes of the first set of one or more media data routes is a forward error correction media data route. In some embodiments, the first set of one or more media data routes is semi-static and changes responsive to one or more nodes joining or leaving the first peer-to-peer network. In some embodiments, the live media data is an individual frame of a media item.

In some embodiments, the first set of one or more media data routes comprises a first route for providing (e.g., pushing) the live media data from a media distribution node to the first node, a second route for providing (e.g., pushing) the live media data from the first node to the second node, and a third route for providing (e.g., pushing) the live media data from the second node to the third node. FIG. 2 may include a representation of such a set of media data routes (e.g., media data routes 240-244).

At block 630, processing logic can transmit one or more portions of the first configuration to each of the first node, the second node, and the third node. In some embodiments, processing logic can further receive, at the server, a second request to register with the first peer-to-peer network from a fourth node. Processing logic can generate a second configuration for a second peer-to-peer network comprising at least the first node, the second node, the third node, and the fourth node. The second configuration may define a second set of one or more media data routes to provide (e.g., push) the live media data to one or more peer nodes of the second peer-to-peer network as the live media data is received by a respective one of the first node, the second node, the third node, and the fourth node. Processing logic can transmit one or more portions of the second configuration to each of the first node, the second node, the third node, and the fourth node.

In some embodiments, the second set of one or more media data routes comprises a first route for providing (e.g., pushing) the live media data from a media distribution node to the first node, a second route for providing (e.g., pushing) the live media data from the first node to the second node, a third route for providing (e.g., pushing) the live media data from the second node to the third node, and a fourth route for providing (e.g., pushing) the live media data from the second node to the fourth node. FIG. 3 may include a representation of such a set of media data routes (e.g., media data routes 340-346).

In some embodiments, the second set of one or more media data routes comprises a first route for providing (e.g., pushing) the live media data from the media distribution node to the first node, a second route for providing (e.g., pushing) the live media data from the first node to the second node, a third route for providing (e.g., pushing) the live media data from the first node to the fourth node, a fourth route for providing (e.g., pushing) the live media data from the second node to the third node, and a fifth route for providing (e.g., pushing) the live media data from the fourth node to the third node. FIG. 4 may include a representation of such a set of media data routes (e.g., media data routes 440-448).

In some embodiments, processing logic can further, responsive to detecting the second node is no longer a part of the first peer-to-peer network, generate a second configuration for a second peer-to-peer network comprising at least the first node and the third node. The second configuration may define a second set of one or more media data routes to provide (e.g., push) the live media data to one or more peer nodes of the second peer-to-peer network as the live media data is received by a respective one of the first node and the third node. In some embodiments, the second set of one or more media data routes comprises a first route for providing (e.g., pushing) the live media data from a media distribution node to the first node and a second route for providing (e.g., pushing) the live media data from the first node to the third node. Processing logic can further transmit one or more portions of the second configuration to each of the first node and the third node.

Referring to FIG. 7, at block 710, processing logic can receive, at a first node of a peer-to-peer network, a configuration defining one or more media data routes to provide (e.g., push) live media data to one or more peer nodes of the peer-to-peer network as the live media data is received by the first node.

At block 720, processing logic can establish one or more media data connections to the one or more peer nodes based on the one or more media data routes.

At block 730, processing logic can receive live media data from a first parent node of the first node via a first media data connection of the one or more media data connections.

At block 740, processing logic can retransmit the live media data to a first child node of the first node via a second media data connection of the one or more media data connections.

In some embodiments, processing logic can further receive the live media data from a second parent node via a third media data connection of the one or more media data connections. In some embodiments, processing logic can further retransmit the live media data to a second child node via a third media data connection of the one or more media data connections. In some embodiments, the first parent node is a media distribution node. In some embodiments, the first parent node is a peer node of the peer-to-peer network.

In some embodiments, to retransmit the live media data to the first child node, processing logic can copy the live media data provided via the first media data connection of the one or more media data connections with the first parent node for transmission via the second media data connection of the one or more media data connections with the first child node without inspecting the live media data. In some embodiments, processing logic can further cause the live media data to be reproduced. In some embodiments, the live media data is an individual frame of a media item.

Figure 8:
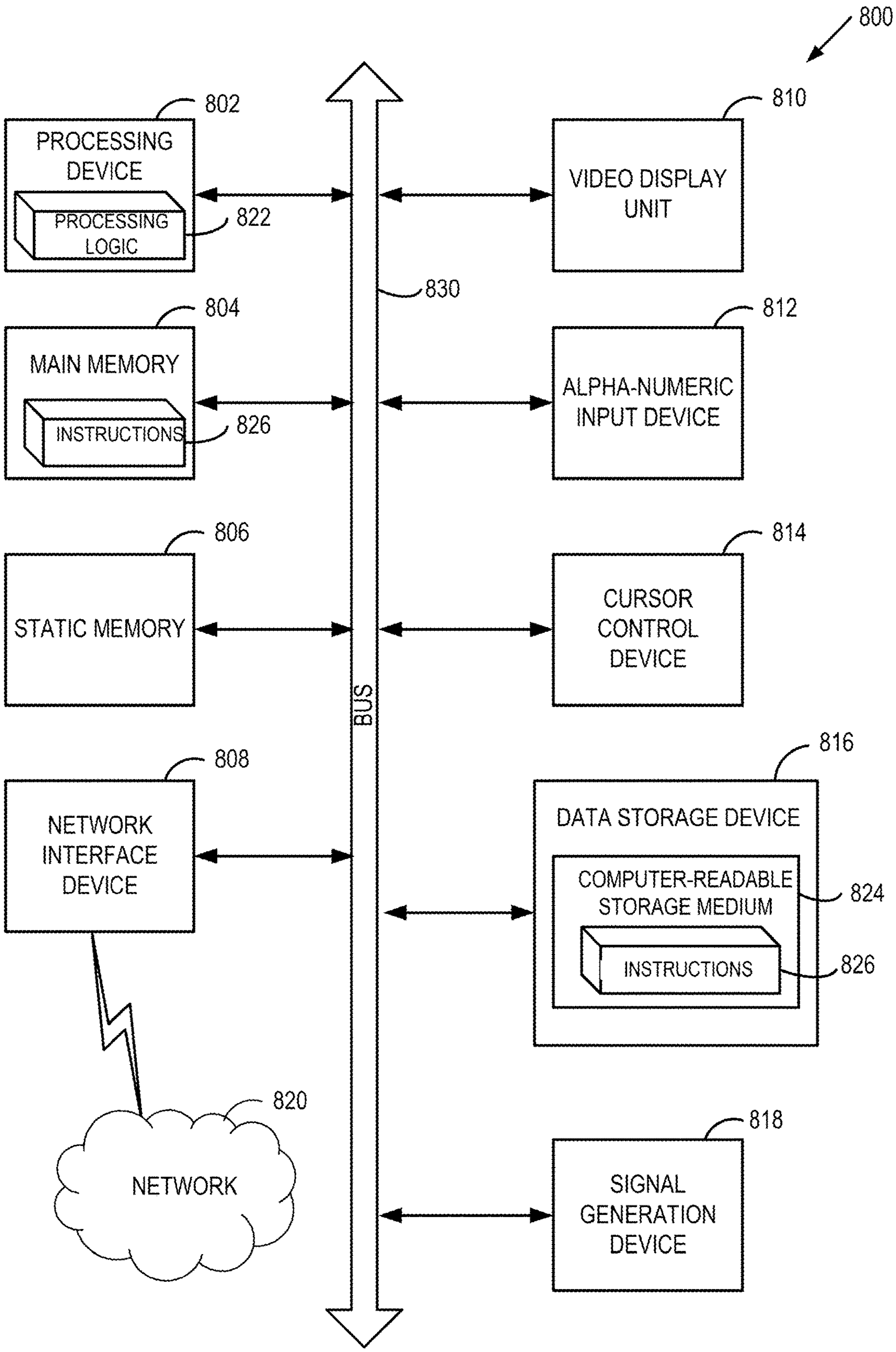
FIG. 8 is a block diagram illustrating an exemplary computer system, in accordance with at least one embodiment of the present disclosure.

FIG. 8 is a block diagram illustrating an exemplary computer system, in accordance with at least one embodiment of the present disclosure. The computer system 800 can correspond to media distribution node 110, network controller 120, and/or peer nodes 142, described with respect to FIG. 1. Computer system 800 can operate in the capacity of a server or an endpoint machine in an endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processing device (processor) 802, a main memory 804 (e.g., read-only memory (ROM), flash memory, dynamic random access memory (DRAM) such as synchronous DRAM (SDRAM), double data rate (DDR SDRAM), or DRAM (RDRAM), etc.), a static memory 806 (e.g., flash memory, static random access memory (SRAM), etc.), and a data storage device 816, which communicate with each other via a bus 830.

Processor (processing device) 802 represents one or more general-purpose processing devices such as a microprocessor, central processing unit, or the like, and may include processing logic 822. More particularly, the processor 802 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 can also be one or more special-purpose processing devices such as an application specific integrated circuit (ASIC), a field programmable gate array (FPGA), a digital signal processor (DSP), network processor, or the like. The processor 802 is configured to execute instructions 826 (e.g., for low latency peer-to-peer networks) for performing the operations discussed herein.

The computer system 800 can further include a network interface device 808. The computer system 800 also can include a video display unit 810 (e.g., a liquid crystal display (LCD) or a cathode ray tube (CRT)), an input device 812 (e.g., a keyboard, and alphanumeric keyboard, a motion sensing input device, touch screen), a cursor control device 814 (e.g., a mouse), and a signal generation device 818 (e.g., a speaker). In some embodiments, computer system 800 may not include video display unit 810, input device 812, and/or cursor control device 814 (e.g., in a headless configuration).

The data storage device 816 can include a non-transitory machine-readable storage medium 824 (also computer-readable storage medium) on which is stored one or more sets of instructions 826 (e.g., for low latency peer-to-peer networks) embodying any one or more of the methodologies or functions described herein. The instructions can also reside, completely or at least partially, within the main memory 804 and/or within the processor 802 during execution thereof by the computer system 800, the main memory 804 and the processor 802 also constituting machine-readable storage media. The instructions can further be transmitted or received over a network 820 via the network interface device 808.

In one implementation, the instructions 826 include instructions for low latency peer-to-peer networks. While the computer-readable storage medium 824 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," "one embodiment," "an implementation," or "an embodiment," means that a particular feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collected data is anonymized prior to performing any analysis to obtain any statistical patterns so that the identity of the user cannot be determined from the collected data.

What is claimed is:

1. A method comprising:

receiving, at a server, first requests to register with a first peer-to-peer network from a first node, a second node, and a third node, the first peer-to-peer network providing transmission of live media data;

generating, at the server, a first configuration for the first peer-to-peer network comprising at least the first node, the second node, and the third node, wherein:

the first configuration defines a first set of media data routes among the first node, the second node, and the third node prior to receipt of the live media data;

the first configuration causes the first node, the second node, and the third node to forward the live media data based on the first set of media data routes upon receipt of the live media data by a respective one of the first node, the second node, or the third node; and the first configuration designates one or more of the first node, the second node, and the third node as child nodes of one or more other nodes to receive the live media data from a respective parent node of the one or more other nodes; and transmitting one or more portions of the first configuration to each of the first node, the second node, and the third node to cause the first node, the second node, and the third node to transfer the live media data according to the first set of media data routes.

2. The method of claim 1, wherein at least one of the first set of media data routes is a forward error correction media data route.

3. The method of claim 1, wherein the first set of media data routes comprises:

a first route for providing the live media data from a media distribution node to the first node;

a second route for providing the live media data from the first node to the second node; and a third route for providing the live media data from the second node to the third node.

4. The method of claim 1, further comprising:

receiving, at the server, a second request to register with the first peer-to-peer network from a fourth node;

generating, at the server, a second configuration for a second peer-to-peer network comprising at least the first node, the second node, the third node, and the fourth node, the second configuration defining a second set of media data routes to provide the live media data to one or more peer nodes of the second peer-to-peer network upon receipt of the live media data by a respective one of the first node, the second node, the third node, or the fourth node; and transmitting one or more portions of the second configuration to each of the first node, the second node, the third node, and the fourth node.

5. The method of claim 4, wherein the second set of media data routes comprises:

a first route for providing the live media data from a media distribution node to the first node;

a second route for providing the live media data from the first node to the second node;

a third route for providing the live media data from the second node to the third node; and a fourth route for providing the live media data from the second node to the fourth node.

6. The method of claim 4, wherein the second set of media data routes comprises:

a first route for providing the live media data from a media distribution node to the first node;

a second route for providing the live media data from the first node to the second node;

a third route for providing the live media data from the first node to the fourth node;

a fourth route for providing the live media data from the second node to the third node; and a fifth route for providing the live media data from the fourth node to the third node.

7. The method of claim 1, further comprising:

responsive to detecting the second node is not part of the first peer-to-peer network, generating a second configuration for a second peer-to-peer network comprising at least the first node and the third node, the second configuration defining a second set of media data routes to provide the live media data to one or more peer nodes of the second peer-to-peer network upon receipt of the live media data by a respective one of the first node or the third node, the second set of media data routes comprising:

a first route for providing the live media data from a media distribution node to the first node; and a second route for providing the live media data from the first node to the third node; and transmitting one or more portions of the second configuration to each of the first node and the third node.

8. The method of claim 1, wherein the first set of media data routes is semi-static and changes responsive to one or more nodes joining or leaving the first peer-to-peer network.

9. The method of claim 1, wherein the live media data is an individual frame of a media item.

10. A system comprising:

a memory device; and a processing device coupled to the memory device, the processing device to perform operations comprising:

receiving, at a server, first requests to register with a first peer-to-peer network from a first node, a second node, and a third node, the first peer-to-peer network providing transmission of live media data;

generating, at the server, a first configuration for the first peer-to-peer network comprising at least the first node, the second node, and the third node, wherein:

the first configuration defines a first set of media data routes among the first node, the second node, and the third node prior to receipt of the live media data;

the first configuration causes the first node, the second node, and the third node to forward the live media data based on the first set of media data routes upon receipt of the live media data by a respective one of the first node, the second node, or the third node; and the first configuration designates one or more of the first node, the second node, and the third node as child nodes of one or more other nodes to receive the live media data from a respective parent node of the one or more other nodes; and transmitting one or more portions of the first configuration to each of the first node, the second node, and the third node to cause the first node, the second node, and the third node to transfer the live media data according to the first set of media data routes.

11. The system of claim 10, wherein at least one of the first set of media data routes is a forward error correction media data route.

12. The system of claim 10, wherein the live media data is an individual frame of a media item.

13. A non-transitory computer-readable medium comprising instructions, which when executed by a processing device, causes the processing device to perform operations comprising:

receiving, at a server, first requests to register with a first peer-to-peer network from a first node, a second node, and a third node, the first peer-to-peer network providing transmission of live media data;

generating, at the server, a first configuration for the first peer-to-peer network comprising at least the first node, the second node, and the third node, wherein:

the first configuration defines a first set of media data routes among the first node, the second node, and the third node prior to receipt of the live media data;

the first configuration causes the first node, the second node, and the third node to forward the live media data based on the first set of media data routes upon receipt of the live media data by a respective one of the first node, the second node, or the third node; and the first configuration designates one or more of the first node, the second node, and the third node as child nodes of one or more other nodes to receive the live media data from a respective parent node of the one or more other nodes; and transmitting one or more portions of the first configuration to each of the first node, the second node, and the third node to cause the first node, the second node, and the third node to transfer the live media data according to the first set of media data routes.

14. The non-transitory computer-readable medium of claim 13, wherein at least one of the first set of media data routes is a forward error correction media data route.

15. The non-transitory computer-readable medium of claim 13, wherein the first set of media data routes comprises:

a first route for providing the live media data from a media distribution node to the first node;

a second route for providing the live media data from the first node to the second node; and a third route for providing the live media data from the second node to the third node.

16. The non-transitory computer-readable medium of claim 13, the operations further comprising:

receiving, at the server, a second request to register with the first peer-to-peer network from a fourth node;

generating, at the server, a second configuration for a second peer-to-peer network comprising at least the first node, the second node, the third node, and the fourth node, the second configuration defining a second set of media data routes to provide the live media data to one or more peer nodes of the second peer-to-peer network upon receipt of the live media data by a respective one of the first node, the second node, the third node, or the fourth node; and transmitting one or more portions of the second configuration to each of the first node, the second node, the third node, and the fourth node.

17. The non-transitory computer-readable medium of claim 16, wherein the second set of media data routes comprises:

a first route for providing the live media data from a media distribution node to the first node;

a second route for providing the live media data from the first node to the second node;

a third route for providing the live media data from the second node to the third node; and a fourth route for providing the live media data from the second node to the fourth node.

18. The non-transitory computer-readable medium of claim 16, wherein the second set of media data routes comprises:

a first route for providing the live media data from a media distribution node to the first node;

a second route for providing the live media data from the first node to the second node;

a third route for providing the live media data from the first node to the fourth node;

a fourth route for providing the live media data from the second node to the third node; and a fifth route for providing the live media data from the fourth node to the third node.

19. The non-transitory computer-readable medium of claim 13, the operations further comprising:

responsive to detecting the second node is not part of the first peer-to-peer network, generating a second configuration for a second peer-to-peer network comprising at least the first node and the third node, the second configuration defining a second set of media data routes to provide the live media data to one or more peer nodes of the second peer-to-peer network upon receipt of the live media data by a respective one of the first node or the third node, the second set of media data routes comprising:

a first route for providing the live media data from a media distribution node to the first node; and a second route for providing the live media data from the first node to the third node; and transmitting one or more portions of the second configuration to each of the first node and the third node.

20. The non-transitory computer-readable medium of claim 13, wherein the first set of media data routes is semi-static and changes responsive to one or more nodes joining or leaving the first peer-to-peer network.

* * * * *